Patented Dec. 31, 1940

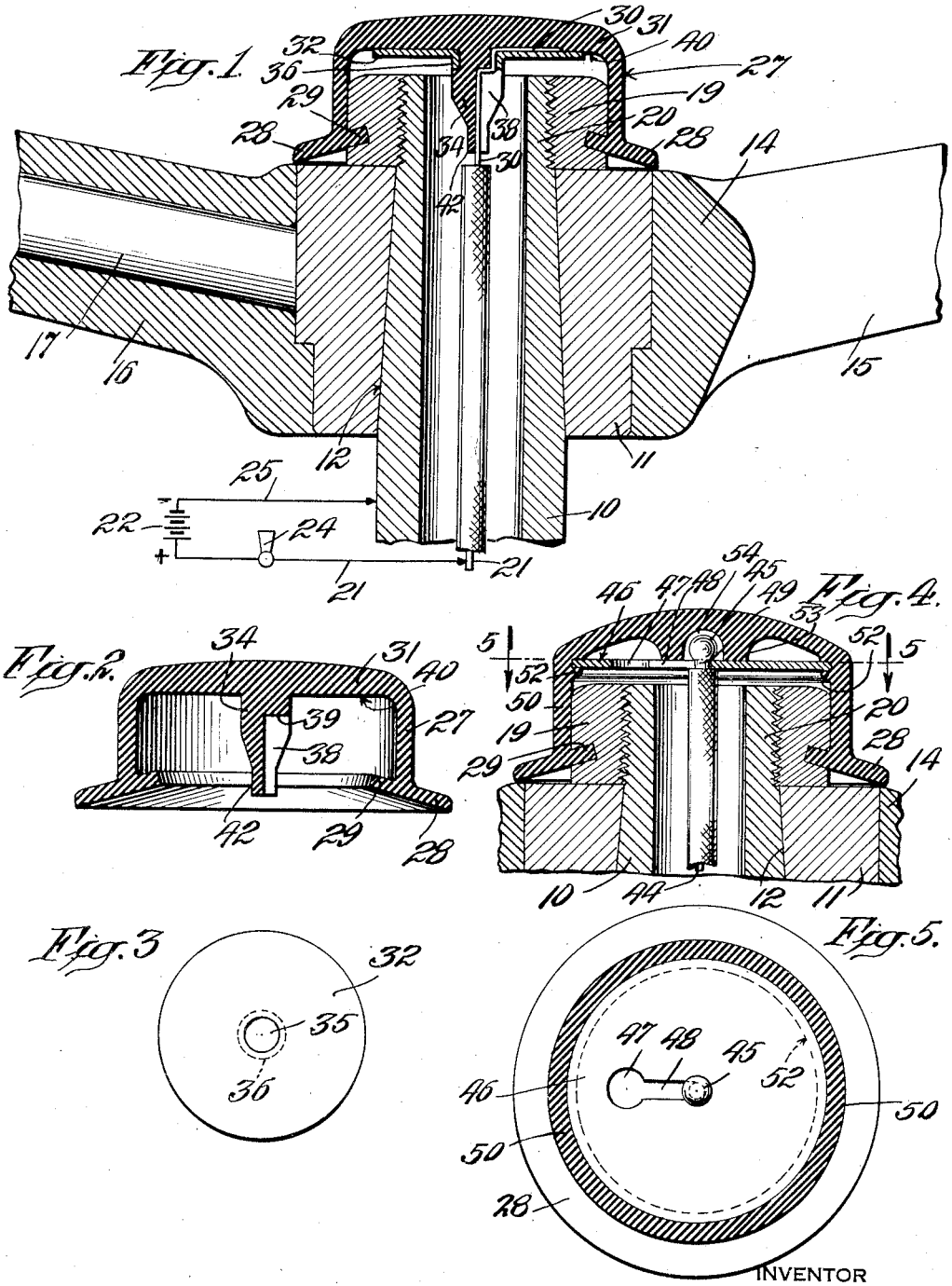

2,227,250

UNITED STATES PATENT OFFICE 2,227,250

DEVICE FOR OPERATING AUTOMOBILE HORNS

Ernest Dirrig, East Akron, Ohio, assignor to American Hard Rubber Company, New York, N. Y., a corporation of New York Application May 13, 1939, Serial No. 273,402

3 Claims. (Cl. 200—59)

The invention relates to an improvement in devices for operating automobile horns.

In the continued effort to produce automobiles at the lowest possible cost in response to the persistent demand for low-priced cars, every part of the automobile is a matter of study and inquiry to ascertain whether it is possible to simplify and thereby reduce its cost of production. Along with other parts of automobiles, there has been an effort to simplify the construction and reduce the cost of production of the devices for operating the horn or sound-making apparatus of the automobile. The horn-operating devices are usually controlled by a disk-like button or pressure member located on top of the hub of the steering wheel mounted on the upper end of the steering post for controlling the front wheels of the car. The upper end of the hub and steering post is usually hollowed out as a well or recess to accommodate the mechanism for making and breaking the electric-wire circuit in which the horn or other sound-producing apparatus is located. This arrangement has been found to be relatively too expensive to produce in comparison with the cost of production of other parts of automobiles selling at the lowest prices.

It is the object of the present invention to provide a device for operating automobile horns which does not require a recess or well in the upper end of the hub of the steering wheel in order to contain the horn operating mechanism, but is applicable to a steering wheel hub and steering post construction which presents a flat outer surface, except for the usual central bore in the post to accommodate the positive wire. To this end the invention consists in the provision of a contact point (connected with the positive wire of the horn circuit) carried by a resilient member or cap adapted to be connected with the hub of the steering wheel or with the upper end of the hollow steering post. Depression of the resilient contact-point holding cap brings the contact point into engagement with the upper end of the steering post or the nut thereon holding the steering wheel hub in place, thereby closing the circuit through the battery which actuates the horn. The invention is more fully described hereinafter and is particularly pointed out in the appended claims.

In the accompanying drawing illustrating embodiments of the invention, Fig. 1 is a vertical section through the hub portion of the steering wheel of an automobile, and showing the application of the improved horn operating device thereto, and also indicating diagrammatically the connection between it and the horn and battery; Fig. 2 is a transverse section through the resilient cap; Fig. 3 is a top plan view of the metal contact disk carried by the resilient cap for closing the circuit through the battery; Fig. 4 is a view similar to Fig. 1 of a modified form of the invention; and Fig. 5 is a longitudinal section taken on the line 5—5 of Fig. 4.

The steering apparatus in connection with which the horn operating device of the present invention is associated, may be of any usual or preferred construction, and in the arrangement shown in the drawing it comprises a slantingly upright or vertical, hollow steering post 10, only the upper end of which is shown, a steering wheel hub 11 mounted on the tapered portion 12 of the steering post and over which fits the central part 14 of the steering wheel from which project the spokes 15 which are as usual composed of hard rubber 16 overlying a metal reinforcement 17. A nut 19 (which may be hexagonal) threaded onto the upper projecting end 20 of the steering post 10 holds the hub 11 firmly in position.

Passing upwardly through the hollow steering post 10 is a positive wire 21 leading from the positive pole of a battery 22. The horn 24 or other sound-producing device is connected with the wire 21. A negative wire 25 leading from the negative side of the battery is connected with the steering post 10.

The improved horn operating device, as shown in Fig. 1, comprises a resilient cap 27 which completely surrounds the nut 19 and is provided at its lower end with a down-turned flange 28 which contacts with the upper surface of the steering wheel hub. The inner extension 29 of the flange 28 projects into a groove in the lower part of the periphery of the nut 19, whereby the lower end of the cap 27 is securely locked in position on the nut, while permitting the upper end of the cap to move axially and laterally, that is, to be depressed and then return to normal position. The material of which the resilient cap 27 is composed may be soft rubber, synthetic soft rubber or other material which is resilient or flexible enough to return to the condition shown in Fig. 1 after being depressed, and the life of which will be at least that of the automobile on which it is installed.

The circuit closing element of the improved horn-operating device may take a variety of forms and be connected with the interior of the resilient cap in various ways, the principle of the invention being that the free, extending end of the positive wire is so held by the resilient cap that it is normally out of contact with the steering post, and on depression of the cap is brought into temporary contact with the post, nut or steering wheel hub, to close the circuit through the battery and actuate the horn. To this end the free, extending end of the positive wire may simply be secured against the under surface of the top of the cap in any preferred manner, or be held there by a contact point. The illustrated embodiment of the invention indicates two ways in which this can be effected. In Fig. 1 the upper or free, extending end 30 of the positive wire 21 is held against the under surface of the upper end or top 31 of the resilient cap 27 by means of a metal contact point in the form of a plate 32 which in turn is held against the under surface of the top of the cap 27 by the resilient engagement therewith of a stud or teat-like part 34 extending downwardly from the center of the top of the cap. The plate 32 is in the form of a disk provided with a central opening 35 surrounded by a downwardly-extending flange 36.

The diameter of the body part of the stud 34 is normally greater than the diameter of the hole 35, as shown in Fig. 1, and accordingly, when the plate 32 is mounted thereon the engagement between the stud and the bottom end of the flange 36 forces the plate 32 into snug engagement with the under surface of the top of the cap 27 and at the same time makes a satisfactory electrical contact between the upper surface of the plate 32 and the overlying end 30 of the positive wire 21. The assembly of these parts may be effected as follows: The free end of the positive wire 21 is laid in the slot 38 in the stud 34, is bent around the upper end 39 of the slot and then laid up against the under surface 40 of the top end 30 of the cap 27. The plate 32 is then placed over the reduced lower end 42 of the stud 34 with the circular flange 36 extending downwardly. The reduced lower end 42 of the stud is then pulled downwardly or outwardly until the main body 34 of the stud is reduced to a diameter less than the diameter of the hole 35 so that the plate may be moved upwardly to bring its upper surface firmly into contact with the under surface 40 of the top end 31 of the cap 27. Thereupon the lower end of the stud is released and the body part 34 thereof returns to normal condition, that is, to a diameter greater than the hole 35 in the plate 32. The material of which the cap 27 is composed being highly resilient, the body part 34 of the stud expands laterally and forms a shoulder at its contact with the lower end of the flange 36, thereby resiliently but firmly pressing the plate 32 into contact with the under surface of the upper end of the cap 27, and holding the free end 30 of the positive wire 21 in such position that when the upper end of the cap 27 is depressed the wire end 30 and the plate 32 move in unity into and out of contact with the upper end of the steering post 10, that is to say, establishing and breaking contact between the end 30 of the positive wire and the steering post so as to close and open the circuit through the battery 22 and the horn 24.

In the modified form of the invention shown in Fig. 4 the upper extremity of the positive wire 44 is enlarged and formed as a knob or ball 45 which through the resiliency of the wire 44 is held down against the central point of the upper surface of the contact plate 46. The knob 45 is assembled with the plate 46 by providing the latter with an eccentrically located opening 47 larger in diameter than the knob 45 and a slot 48 slightly wider than the diameter of the neck 49 of the knob 45 and with which the upper end of the positive wire 44 is connected. By passing the knob 45 upwardly through the hole 47 and then moving the plate 46 sidewise the knob 45 is brought to the center of the plate. Thereupon the plate is slipped into the resilient cap 50 the lower end of which is exactly the same in constructions as the lower end of the cap 27 shown in Figs. 1 and 2, and given the same reference numerals. The contact plate 46 is held in position in the upper end of the resilient cap 50 in a groove formed in the internal circumferential bead 52. The upper surface of the plate 46 is held against the lower surface of the circular central boss 53 depending from the top of the resilient cap 50 and the knob 45 occupies a central opening 54 in the boss 53. The operation of this modified form of horn-sounding device is exactly the same as that of the form shown in Fig. 1, namely, by depressing the resilient cap 50 the under surface of the plate 46 is brought into contact with the upper end of the hollow steering post 10 so as to close the circuit between it and the positive wire 44 and thereby sound the horn.

It will be understood that the two forms of the invention described above and illustrated in the drawings are simply representative of the numerous ways in which the free end of the positive wire may be electrically connected with the steering post, either directly therewith or through the nut 19 or steering wheel hub. It will also be understood that the resilient cap which carries the free end of the positive wire, and for mechanical convenience, the contact piece for holding the free end of the positive wire, so that each time the resilient cap is depressed the current will pass from the positive wire through the contact piece and into the steering post, may be otherwise arranged than as shown in Figs. 1 and 4. The principle is understood to be that a resilient material in the form of a hollow cup-like member or cap covering the upper end of the steering post and associated parts carries in more or less fixed or operative position on the under surface of the top of the cap, the free end of the positive wire which either directly or through a contact piece closes the circuit through the horn actuating battery when the resilient cap is moved to a certain position and that when the cap moves away from that position the circuit is broken.

Having thus described the invention, what I claim as new is:

1. A horn circuit-closing switch device for use in combination with a steering wheel including the upper end of a hollow post on which the wheel is mounted and through which passes the free end of the positive wire of the circuit, said device comprising a resilient, non-conducting cap connected at its lower end with the post, there being a space between the under surface of the top of the cap and the top end of the post, and a disc-like metal plate in flat engagement with the bottom face of the cap over substantially the entire area of said plate fixedly positioned in the cap and normally separated from the top end of the post, a nipple depending centrally from said cap with a side slot therein, said plate having a central opening for passage of and interlocking engagement with said nipple, the free end of the positive wire extending upwardly through the slot in the nipple and being in engagement with the plate so as to move therewith, the arrangement being such that on compression of the resilient cap the plate is brought into engagement with the post and on release of the cap the plate is disengaged from the post.

2. A horn circuit-closing switch device for use in combination with the hub structure of a steering wheel including the upper end of a hollow post on which the hub is mounted and through which passes the free end of the positive wire of the circuit and a nut mounted on the upper end of the post, the upper surface of the nut and the top end of the post being substantially flat, said device comprising a resilient, non-conducting cap connected at its lower end with and surrounding the nut and extending upwardly to provide a space between the under surface of the top of the cap and the upper end of the post and the nut, and a disc-like metal plate positioned against the under surface of the top of the cap by inter-engagement between it and portions of the interior of the cap, said cap being normally separated from the top end of the post and the nut, the free end of the positive wire being in electrical contact with the plate, the arrangement being such that on depression of the resilient cap toward the post, the plate is brought into contact with the upper end of the post and of the nut.

3. A horn circuit-closing switch device for use in combination with a steering wheel including the upper end of a hollow post on which the wheel is mounted and through which passes the free end of the positive wire of the circuit, said device comprising a resilient, non-contacting cap connected at its lower end with the post, there being a space between the under surface of the top of the cap and the top end of the post, a disc-like metal plate positioned in the cap and peripherally interengaged with the cap and normally spaced from the top end of the post, a boss depending centrally from the top wall of the cap engaging the upper side of the plate, and having a downwardly opening socket therein, the free end of the positive wire being in engagement with the plate and extending upwardly into the socket in the boss so as to move with the plate, the arrangement being such that on compression of the resilient cap the plate is brought into engagement with the post and on release of the cap the plate is disengaged from the post.

ERNEST DIRRIG.